United States Patent [19]
Nord

[11] Patent Number: 6,003,872
[45] Date of Patent: *Dec. 21, 1999

[54] METHOD OF MONITORING A SEAL FOR CORRECT OPERATION, AND MONITORING DEVICE FOR CARRYING OUT THE METHOD

[76] Inventor: Klaus Jürgen Nord, Friedrichstrasse 81, D-68199 Mannheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/669,331
[22] PCT Filed: Dec. 16, 1994
[86] PCT No.: PCT/DE94/01503
  § 371 Date: Sep. 16, 1996
  § 102(e) Date: Sep. 16, 1996
[87] PCT Pub. No.: WO95/18363
  PCT Pub. Date: Jul. 6, 1995

[30] Foreign Application Priority Data

Dec. 30, 1993 [DE] Germany .......................... 93 20 143 U

[51] Int. Cl.[6] .......................................................... F16J 15/54
[52] U.S. Cl. .......................................... 277/317; 277/321
[58] Field of Search ............................. 384/448; 324/173, 324/174, 207.22, 207.25; 277/309, 311, 313, 314, 317, 320, 321

[56] References Cited

U.S. PATENT DOCUMENTS

| | | | |
|---|---|---|---|
| 5,026,178 | 6/1991 | Ballhaus | 384/448 |
| 5,121,929 | 6/1992 | Cobb | 277/2 |
| 5,246,235 | 9/1993 | Heinzen | 277/2 |
| 5,310,266 | 5/1994 | Coux et al. | 384/448 |
| 5,345,829 | 9/1994 | Yamauchi et al. | 277/2 |
| 5,448,924 | 9/1995 | Nagai et al. | 277/2 |
| 5,529,346 | 6/1996 | Sperring | 277/2 |
| 5,594,334 | 1/1997 | Sonnerat et al. | 384/448 |

FOREIGN PATENT DOCUMENTS

| | | |
|---|---|---|
| 0 454 374 | 10/1991 | European Pat. Off. . |
| 0 568 184 | 11/1993 | European Pat. Off. . |
| 29 41 564 | 4/1981 | Germany . |
| 3006656 | 9/1981 | Germany ................... 277/2 |
| 42 12 973 | 10/1993 | Germany . |
| 42 25 815 | 2/1994 | Germany . |
| 43 05 338 | 8/1994 | Germany . |
| WO 95/06237 | 3/1995 | WIPO . |

*Primary Examiner*—Anthony Knight
*Assistant Examiner*—John L. Beres
*Attorney, Agent, or Firm*—Collard & Roe, PC

[57] ABSTRACT

The invention relates to a method and a device for monitoring a seal (1, 6, 11, 19) for correct operation, including the tightness of such seal, preferably a seal on a shaft (5) surrounding the latter. At least one sensor (3, 3'; 7, 7'; 16, 16'; 20, 20') is present on the seal (1, 6, 11, 19) or in the seal (1, 6, 11, 19) or within the sealing material of the seal, such sensor directly detecting the mechanical-dynamic stresses or deformations or movements of the seal (1, 6, 11, 19) or of the sealing material (2, 12) of the seal and converts them into corresponding electric signals, which can be picked up on the sensor for their interpretation and processed further. The correct operation including the tightness of the seal (1, 6, 11, 19) can be deduced from the interpreted signal of the sensor.

13 Claims, 3 Drawing Sheets

METHOD OF MONITORING A SEAL FOR CORRECT OPERATION, AND MONITORING DEVICE FOR CARRYING OUT THE METHOD

TECHNICAL FIELD

The invention relates to a method of monitoring a seal for correct operation, or the tightness of such seal, with the help of sensors, as well as to a device for carrying out the method.

STATE OF THE ART

Seals are conceived for different functions on technical equipment for securing such functions and, therefore, can be used in many different ways, so that such seals basically represent a safety-relevant machine component. A considerable safety risk is always on hand if the sealing function relates to safety-relevant parts in general, and specifically to, for example rotary shafts of technical equipment, in the area of high safety of flying equipment or nuclear power plants, and when a seal gets damaged there, or fatigued for age reasons. Currently, for detecting damages, separate measuring devices are mounted within the range of a seal, which generate an electric signal in the event of damage.

Furthermore, seals are presently not used as components of independent switching or measuring devices, so that measuring signals for controlling or regulating technical installations within the zone of seals as well as for monitoring the seal itself can be carried out only by way of additional systems.

A system for monitoring a sliding ring seal has become known from EP-A1-0 568 184, in which a spring-loaded, displaceable wedge is arranged on a basic part, the latter being sealed against the rotating shaft, which wedge gets displaced if the sealing is untight; the movement of said wedge can be monitored by means of a video camera. A device also intended for monitoring ring seals on shafts has become known from EP-A2-0454374, in connection with which a sliding ring is displaced in the event of leakiness, the displacement of said ring being interpreted electrically, whereby it is possible to optically detect the displacement of the shaft. In both cases, therefore, any impermissible movement of the seal or shaft is translated into a movement of an adjacent body, whose movement in turn is scanned optically or measured electrically.

A seal consisting of a basic body made of elastomeric material has become known from DE 43 05 338 A1, which, if need be, has a metallic reinforcing body, and which comprises a sensor connected to the seal. The basic body has at least one area with physical properties different from those in the remaining area, so that the basic body functions as the signal generator. A sensor is solidly mounted within the environment separated from the seal, such sensor registering the changes caused by the segment-like areas with the different physical properties.

A load-sensitive flat seal consisting of two parts, with a central through-extending hole forming a service opening for fluids, has become known from U.S. Pat. No. 5,121,929, in which a load sensor is arranged between the two parts. The load sensor consists of electrodes opposing each other, with a pressure-sensitive electric resistance material being arranged between the electrodes; electric feed lines lead from the electrodes to outside of the flat seal in order to send an electric current through the electric resistance material, such current changing with a change in load as well. The flat seal consequently is a passive load sensor.

TECHNICAL PROBLEM

The invention is based on the problem of directly monitoring a seal, in particular a seal on a shaft, such seal surrounding the shaft, for the correct operation of the seal, or for its tightness, in a way such that in the event of any abnormal behavior of the seal, or when a leakage occurs, the seal emits a monitoring signal.

DISCLOSURE OF THE INVENTION AND ITS ADVANTAGES

According to the invention, said problem is solved in that at least one sensor is arranged on the seal or in the seal or within the sealing material of the seal, which sensor directly detects the mechanical-dynamic stresses or deformations or movements within the range of the seal or in the seal or within the sealing material of the seal, and transforms such stresses or deformations or movements into electric signals, which can be picked up on the sensor for their interpretation and further processing, whereby the correct operation of the seal including its tightness is deduced from the interpreted signal of the sensor.

The method according to the invention has the advantage that all safety-relevant data on a seal, as well as those data originating from the closer or directly adjacent range of the seal, or directly from the seal itself, for example from a rotating shaft within the range of the seal, within the sensor of the seal, or from the sensor present in the immediate vicinity of the seal, are directly generated as an electric signal. In this way, it is possible in an advantageous manner to continuously measure and monitor the correct operation of a seal, in particular the tightness of a seal on an axle or shaft, so that in the presence of the slightest measurable sign of an anomality or leakage of the seal, a reaction takes place accordingly, and the seal, for example can be replaced before more serious damage is caused on a valuable machine or installation. Also, the seal is capable of operating as an independent measuring and controlling device in that a movement, preferably a continuous rotary motion of at least one pulse generator or pulse-triggering device is foreseeably detected, so that the seal can be used accordingly for controlling and regulating signal interpretation systems of technical equipment, and for controlling the seal itself.

The signals, which are generated by means of the sensors, can be directly converted in the known way by optical or sound or computer-controlled measurement and signal interpretation systems; in the simplest case, a control lamp lights up as an optical signal interpretation. Said method is basically applicable in a seal irrespectively of the type of seal, whereby the one or several sensors operating accordingly detect the respective measured quantity directly within the seal or the sealing material of the seal, or on the seal. In this way, the pressure or the elasticity or phenomena of fatigue within a seal, or leakages between a seal and a shaft can be continuously measured and checked.

An important advantage of the invention is that with a seal according to the invention, the safety standard of technical equipment as a measuring device that is applicable in many different ways, can be significantly enhanced and manufactured at more favorable cost.

For measuring deformations, stresses and movements on the seal or within the seal or within the sealing material of the seal, preferably electromechanically operating sensors are used, for example piezo-elements or Hall generators, which are arranged on the seal or in the seal, or incorporated within the sealing material of the seal, so that it is assured that the sensors are capable of picking up mechanical stresses or deformations or movements on the seal or in the seal, or within the sealing material of the seal, and to convert such stresses or deformations or movements into electric signals, so that it is possible, for example to reduce the forces occurring on the seal or in the seal or within the sealing material of the seal, and to counteract such forces in a suitable way before a damage is caused, for example by replacing a seal that becomes defective.

For measuring processes of motion on a seal, preferably sensors are proposed which generate through a moved pulse generator an electric signal, for example magnetic sensors. It is possible to use in this case a bearing as the pulse generator, for example a ball bearing, whose movable parts, namely the balls of the bearing, or also a structured ball cage, move within the range of the seal, generating in this way in the sensor of the seal a signal, particularly an electric signal, which can be picked up and interpreted in this case accordingly. It is consequently possible to measure accelerations or delays of parts of the bearing, or accelerations and delays of the moved shaft, on which the bearings are arranged; it is possible, for example, to regulate or control on the basis of the frequency of the electric signals here generated technical systems that operate by means of such signals, or which process such signals, for example anti-blocking systems.

According to the invention, it is possible to use all types of sensor which can be arranged on the seal or in the seal or within the sealing material of the seal in order to detect stresses or deformations or processes of movement occurring on the seal or in the seal or within the sealing material of the seal, and to transform such stresses or deformations or processes of motion into an electric measuring or controlling or regulating signal. For example, such converters may be electromechanical converters, for example piezo-systems or magnetic systems, or mechanically operating sensors such as electric contact conductors, which according to their mode of operation are arranged accordingly on the seal or in the seal, or incorporated within the sealing material of the seal. Such contact conductors may be formed by two electric connection points, but also by a one single electric conductor which, for example, is capable of generating a signal when it is destroyed. Also, a combination of such sensors is possible, so that different switching, measuring and testing signals can be generated with the seal and picked up on the sensors.

The transmission of electric signals by a signal transmission device to a signal interpretation system and their interpretation are known, so that the description of the signal interpretation process can be omitted. This applies in the same way to the mode of operation of electromechanical or magnetic and electric contact switches as sensors within the meaning of the invention.

Since even very small piezo-elements are currently available, even small seals having, for example a diameter of just a few millimeters, can be equipped according to the invention, or equipment can be retrofitted. Another advantage of the invention is that a great number of pieces of equipment can be retrofitted with the seals according to the invention without having to carry out more extensive reconstruction.

SHORT DESCRIPTION OF THE DRAWINGS, IN WHICH

Figure 3:
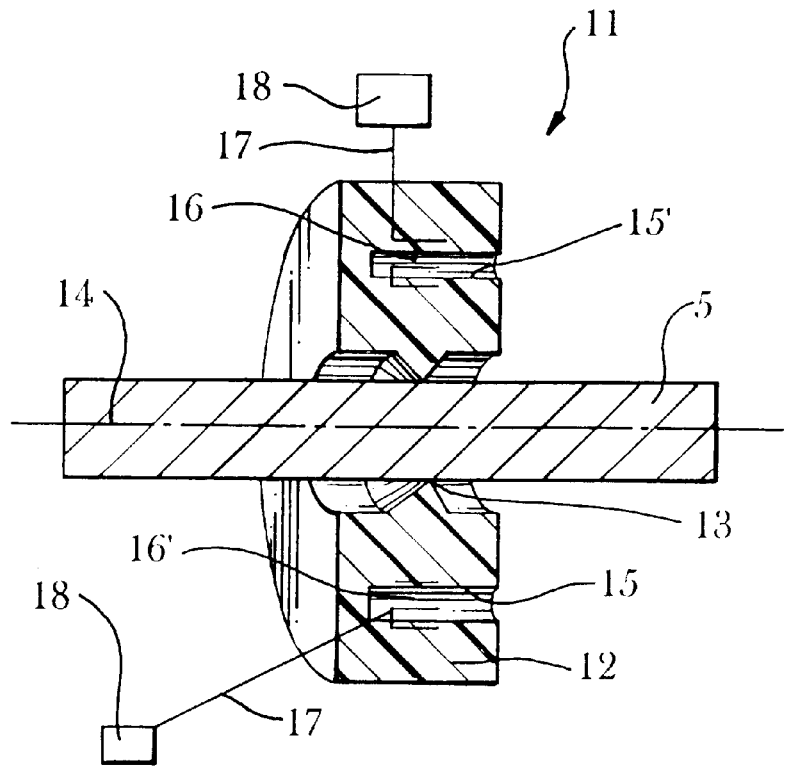
Figure 4:
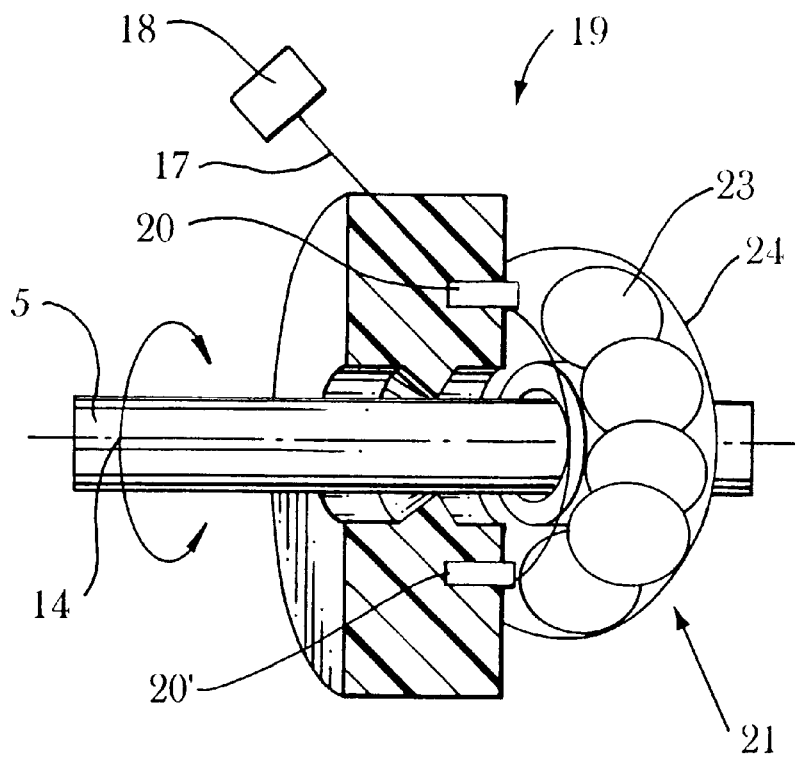
Figure 5:
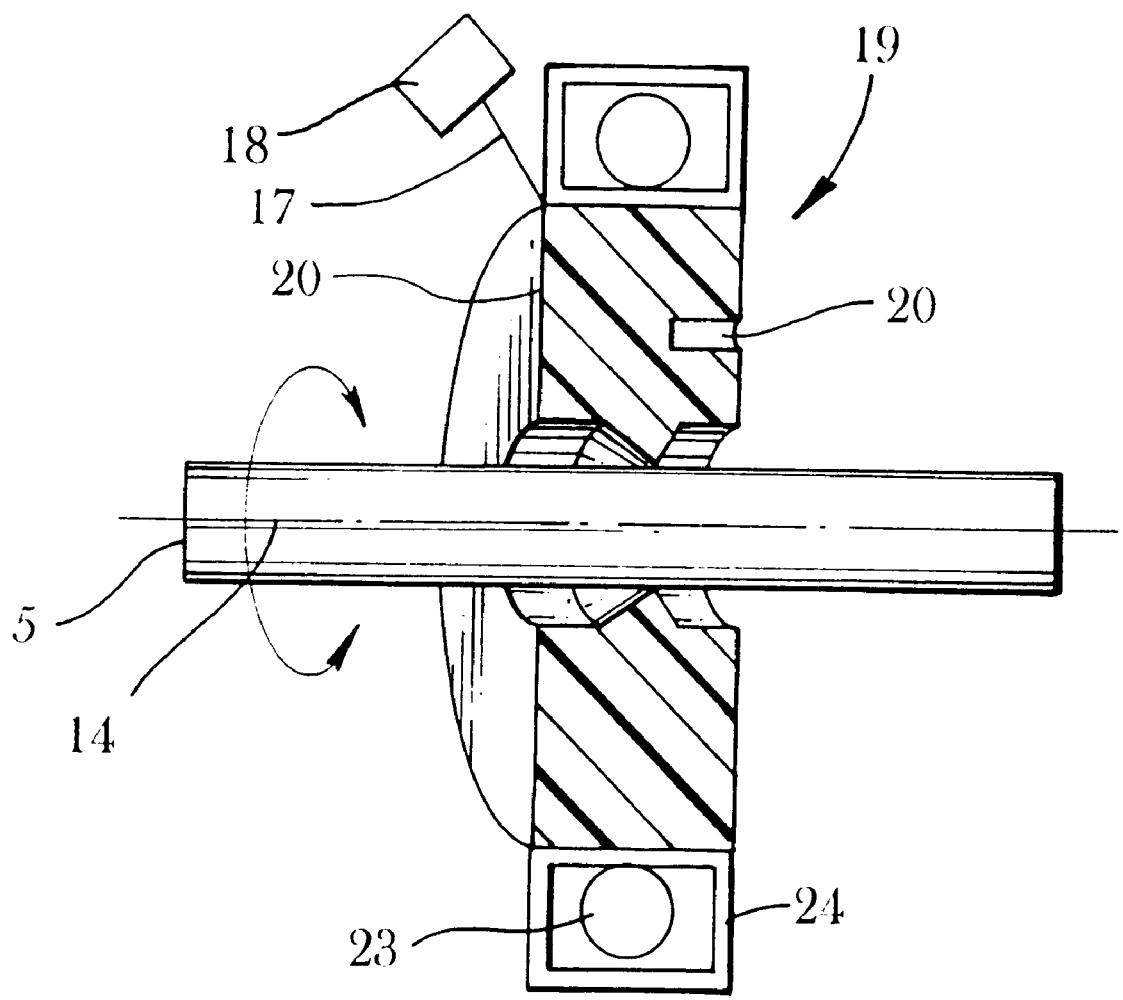

FIG. 3 shows a section through a seal seated on a shaft, with electromechanical sensors incorporated in the material of said seal, such sensors being designed, for example as contact switches; and FIG. 4 shows a section through another seal seated on a shaft, with sensors incorporated in the sealing material on the edge side, which sensors are, for example permanent magnets, and where the seal is opposed by a continuously revolving pulse generator, for example a ball bearing, whereby the shaft and the ball bearing are not shown by a sectional way for the sake of clarity; and FIG. 5 shows an alternative embodiment of the device shown in FIG. 4, in which the ball bearing is incorporated into the sealing material.

PREFERRED EMBODIMENT OF THE INVENTION

Figure 1:
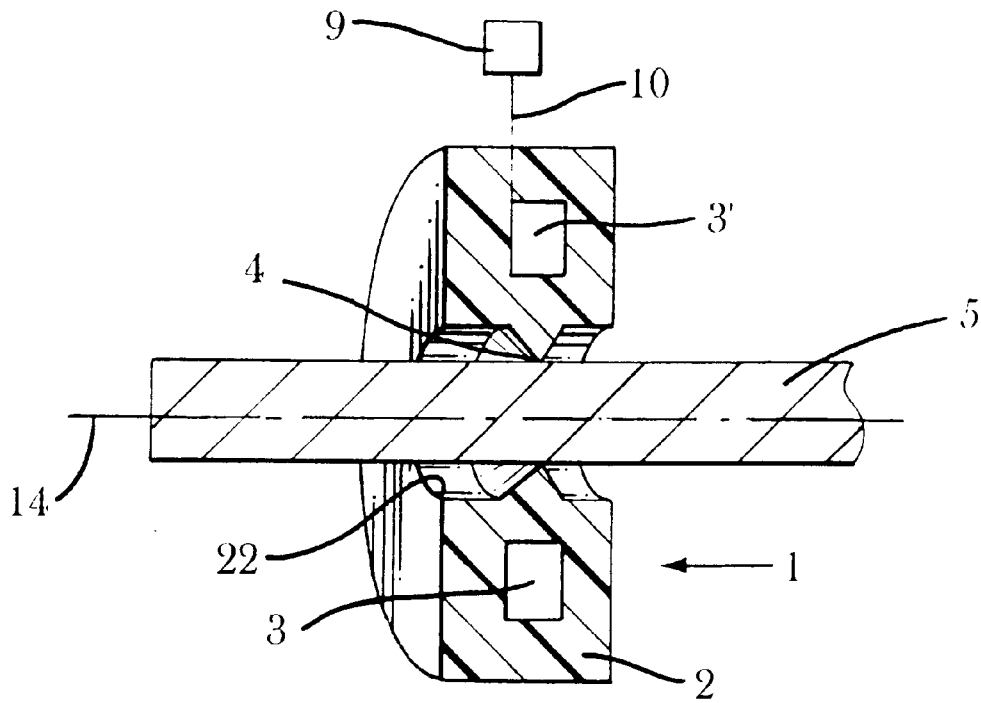
FIG. 1 shows a section through a seal seated on a shaft, with electromechanical sensors incorporated in the seal.

FIG. 1 schematically shows a torus-shaped seal 1 in the section of a diameter plane standing vertically on the longitudinal axis 14 of a shaft 5, the latter being surrounded by the seal 1. On the circumference of the jacket of the center hole 22, the seal 1 has a sealing lip 4 extending all around, said lip resting on the circumference of the shaft 5 and sealing the center hole 22 of the seal 1 against the shaft 5. The sensors 3, 3' are incorporated in the material 2 of the seal 1, such sensors preferably being arranged on a circle within the seal 1 around the center hole 22 of the seal or the shaft 5: said sensors may be completely surrounded by the sealing material. Preferably, the sensors 3, 3' are arranged within the vicinity of the sealing lip 4, so that all movements or deformations of the sealing material 2, in particular of the sealing lip 4, as well as also of the remaining seal 1, are transmitted via the material of the seal 1 to the sensors 3, 3' without notable inner frictional losses. If the sensors are, for example piezo-elements 3, 3', the latter are capable due to the mechanical-dynamic stress changes within the sealing material 2 of generating an electric signal, which is transmitted via a transmission line 10, for example a galvanic electric connection line, to the outside to a signal interpretation unit 9, where it is interpreted.

Figure 2:
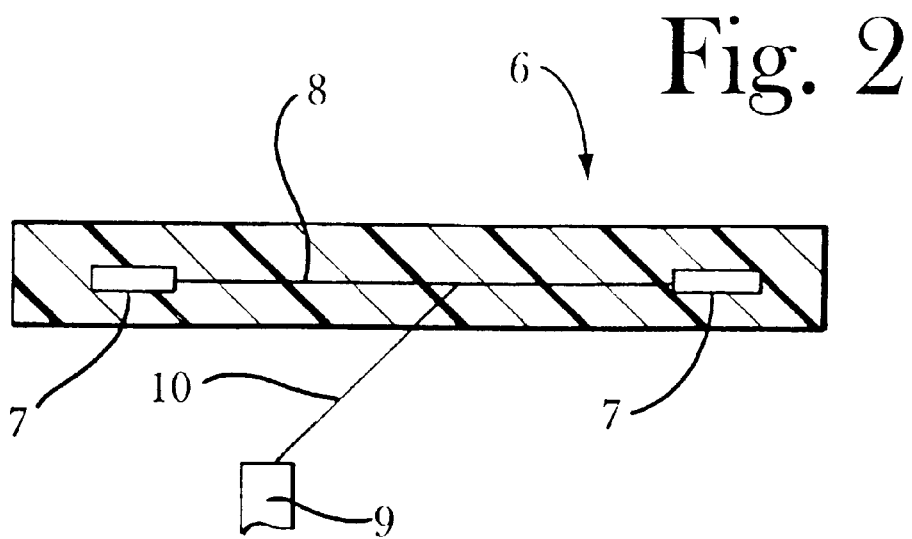
FIG. 2 shows a section through another seal which, for example, may be a flat seal, in which electromechanical sensors are incorporated as well.

FIG. 2 shows another seal 6, which, for example, may be a disk-shaped or torus-like flat seal, within which the sensors 7, 7' are incorporated, which are connected by means of a common line 8, to which a transmission line 10 leading to outside of the seal 6 is coupled, via which line the electric signals generated in the sensors 7, 7' are transmitted to a signal interpretation unit 9. Again, the sensors may be piezo-elements 7, 7'.

FIG. 3 schematically shows another torus-shaped seal 11 in the section of a diameter plane vertically sitting on the longitudinal axis 14 of a shaft 5, the latter being surrounded by the seal 11. The slits 15, 15' or holes are arranged within the sealing 11, such slits or holes extending in the direction of the longitudinal axis 14 of the shaft 5 and being disposed in a circle around the center hole of the seal 11. Electromagnetic sensors are arranged in the slits or holes 15, 15', which sensors may be, for example the contact switches 16, 16', the latter being in intimate contact with the material of the seal 11 surrounding them. In this connection, the contact switches 16, 16' each may consist of two radially arranged, spaced-apart parts which, in the presence of mechanical-dynamic deformations or movements of the seal 11, are capable of moving relative to each other, contacting one another mutually, and which transmit an electric signal via the transmission lines 17 to the outside to the signal interpretation units 18.

FIG. 4 shows a schematic view of yet another torus-like seal 19 in the section of a diameter plane sitting vertically on the longitudinal axis 14 of a shaft 5, the latter being surrounded by the seal 19. Sensors are arranged in the sealing material of the seal 19 preferably in a circle around the center hole, such sensors being, for example the permanent magnets 20, 20' in the present case. Outside of the seal 19 or within its immediate vicinity of the shaft 5, the seal 19 is opposed by a pulse generator 21 which, for example, may be a ball bearing; the signal transmission and the interpretation unit for the electric signals are not shown. Also, the seal may be integrated in the ball bearing as shown in FIG. 5. As the pulse generator 21 or the ball bearing 21 is turning, it is possible because of the motion of the balls 23 of the ball bearing—or also of the cage 24 suitably designed for generating pulses—passing by the sensors, in particular the magnets 20, 20', to generate by means of such sensors corresponding electric signals, and to pick up the latter on the permanent magnets or also on the pulse generator.

Said seal 19 consequently represents a seal designed as an independent switching or measuring device, on which the electric signals can be picked up for further interpretation and processing, whereby the stresses or deformations occurring in the seal, or the processes of motion of the pulse generator 21 occurring on the seal, can be detected by the sensors 20, 20' in any desired combination, and corresponding electric signals can be converted within the sensors 20, 20', which signals can be simultaneously picked up and interpreted on the sensors as measuring signals having different mechanisms of excitation.

The arrangement of sensors on or in the seal is used, for example in connection with a seal consisting of a number of parts or shells.

Commercial Applicability and Usefulness of the Invention

The subject matter of the invention is commercially applicable particularly for monitoring seals of all types. The usefulness of the invention especially lies in the that such a seal equipped with a sensor can be permanently checked for leakages or its operational efficiency in other respects. Furthermore, an advantageous variation of the subject matter of the invention represents an independent switching or measuring device.

List of Reference Symbols

| | |
|---|---|
| 1, 6, 11, 19 | Seals |
| 2, 12 | Sealing materials |
| 3, 3', 7, 7', 16, 16', 20, 20' | Sensors, for example piezo-elements |
| 4, 13 | Sealing lips |
| 5 | Shaft |
| 8 | Connection |
| 9, 18 | Signal interpretation units |
| 10, 17 | Transmission lines |
| 14 | Longitudinal axis |
| 15, 15' | Slits |
| 21 | Pulse generator, e.g. ball bearing |
| 22 | Center hole |
| 23 | Balls of the ball bearing |
| 24 | Cage of the ball bearing |

I claim:

1. A method of monitoring the correct operation of an elastomeric seal that seals against a movable shaft, including monitoring the tightness of the seal on the shaft, comprising:

(a) coupling immediately to the sealing material of the seal at least one sensor that directly detects mechanical-dynamic stresses, deformation or movements of the sealing material of the seal without said sensor coming into contact with the shaft and converts such stresses or deformation or movements into corresponding electric signals;

(b) detecting the electric signals from the sensor; and (c) interpreting such signals to detect the stresses, deformation and movements of the sealing material and to determine the condition of the seal during movement of the shaft.

2. A method for the regulation and control of technical systems, including monitoring the tightness of the seal on the shaft, comprising:

(a) disposing on a movable shaft a seal that seals against the shaft and works as an independent measuring and control instrument;

(b) coupling immediately to the sealing material of the seal at least one sensor which directly detects movements in the immediate area of the seal and transforms such movements into respective electric signals;

(c) disposing a moving pulse generator in the area of the seal and in close proximity to the sensor;

(d) detecting the movements of the pulse generator with the sensor;

(e) converting the movements of the pulse generator into electric signals with the sensor; and (f) detecting the electric signals from said sensor, to monitor and control the technical system.

3. A method according to claim 2 wherein the moving pulse generator is a bearing comprising moving parts wherein the moving parts move past the sensor which generates electric signals corresponding to the movement of the moving parts; said method further comprising interpreting the signals from the sensor in an interpretation unit.

4. A device for monitoring the correct operation of a seal that seals against a movable shaft, including monitoring the tightness of said seal on the shaft, comprising:

(a) at least one sensor immediately coupled to the sealing material of the seal, such sensor being capable of directly detecting mechanical-dynamic stresses, deformations or movements of the sealing material of the seal or the seal without said sensor coming into contact with the shaft and converting such stresses into electrical signals;

(b) means for detecting the electrical signals from said sensor; and (c) means for interpreting the electrical signals from said sensor to deduce the condition of the sealing material of the seal.

5. A device according to claim 4 further comprising a moving pulse generator disposed in close proximity to the sensors such that the sensors are capable of detecting the movements of the moving pulse generator and converting said movements into corresponding electrical signals.

6. A device according to claim 5 wherein the moving pulse generator is a bearing comprising moving parts wherein the movements of the moving parts are in a continuous rotary motion, and wherein the means for interpreting the electrical signals of the sensor is an interpretation unit.

7. A device according to claim 4 wherein the sensors are located within the immediate vicinity of the shaft.

8. A device according to claim 5 wherein said device is for use as an anti-blocking system, wherein said seal operates as an independent measuring device, and wherein the electric signals generated by the sensors are feedable to the anti-blocking system for regulating the system.

9. A device according to claim 5 wherein the sensors are selected from the group comprised of piezo elements, Hall generators, electromechanical switches, magnetic switches, electric contact switches or permanent magnets.

10. A device according to claim 6 wherein the seal is a torus-shaped seal having a center hole and the sensors are arranged in a circle around the center hole of the seal, and wherein the pulse generator is disposed on the shaft in immediate proximity of the seal.

11. A device according to claim 9, wherein the sensors are located within the sealing material of the seal.

12. A device according to claim 5 wherein the moving pulse generator is a bearing coupled to the movable shaft, and wherein the frequency of the electrical signals from the sensors corresponds to the accelerations and delays of the bearing, so that technical systems operating by means of such signals can be regulated or controlled.

13. The device according to claim 6, wherein the ball bearing is integrated with the seal.

\* \* \* \* \*

UNITED STATES PATENT AND TRADEMARK OFFICE
CERTIFICATE OF CORRECTION

PATENT NO. : 6,003,872
DATED : December 21, 1999
INVENTOR(S) : NORD

It is certified that error appears in the above-indentified patent and that said Letters Patent is hereby corrected as shown below:

In column 5, lines 62-63, (lines 1-2 of claim 1):

"an elastomeric seal" should read --a seal--.

Signed and Sealed this

Sixteenth Day of January, 2001

Attest:

Attesting Officer

Q. TODD DICKINSON
Commissioner of Patents and Trademarks